United States Patent
Kim et al.

(10) Patent No.: US 12,546,720 B2
(45) Date of Patent: Feb. 10, 2026

(54) OPTICAL SIGNAL DETECTION DEVICE COMPRISING SAMPLE HOLDER DIVIDED INTO SAMPLE AREAS AND LIGHT SOURCE UNITS DEDICATED THERETO

(71) Applicant: SEEGENE, INC., Seoul (KR)

(72) Inventors: Jin Won Kim, Seoul (KR); Jin Seok Noh, Daejeon (KR); Soon Joo Hwang, Seoul (KR)

(73) Assignee: SEEGENE, INC., Seoul (KR)

( * ) Notice: Subject to any disclaimer, the term of this patent is extended or adjusted under 35 U.S.C. 154(b) by 217 days.

(21) Appl. No.: 17/915,554

(22) PCT Filed: Mar. 31, 2021

(86) PCT No.: PCT/KR2021/004004
§ 371 (c)(1),
(2) Date: Sep. 29, 2022

(87) PCT Pub. No.: WO2021/201597
PCT Pub. Date: Oct. 7, 2021

(65) Prior Publication Data
US 2023/0137550 A1    May 4, 2023

(30) Foreign Application Priority Data
Mar. 31, 2020  (KR) .................. 10-2020-0039501

(51) Int. Cl.
G01N 21/64   (2006.01)
G01J 1/04    (2006.01)
G01J 1/08    (2006.01)

(52) U.S. Cl.
CPC ........ *G01N 21/6452* (2013.01); *G01J 1/0492* (2013.01); *G01J 1/08* (2013.01);
(Continued)

(58) Field of Classification Search
CPC ....... G01N 21/6452; G01N 2021/6419; G01N 2021/6421; G01N 2021/6471;
(Continued)

(56) References Cited

U.S. PATENT DOCUMENTS 4,477,190 A * 10/1984 Liston .................. G01N 21/253
                                                    356/418
8,885,166 B2  11/2014 Bianchessi et al.
(Continued)

FOREIGN PATENT DOCUMENTS

EP         953838 A1 * 11/1999 .......... B01J 19/0046
JP    2005-526254 A       9/2005
(Continued)

OTHER PUBLICATIONS

International Search Report issued in PCT Application No. PCT/KR2021/004004 dated Jul. 9, 2021.
(Continued)

*Primary Examiner* — Thanh Luu
*Assistant Examiner* — Mai Thi Ngoc Tran
(74) *Attorney, Agent, or Firm* — Harness, Dickey & Pierce, P.L.C.

(57) ABSTRACT

An embodiment provides an optical signal detection device including a sample holder configured to accommodate a plurality of samples, a light source module including a plurality of light source units dedicated to each sample area to irradiate light to a plurality of sample areas on the sample holder, a filter module including a plurality of movable moving units for filtering light from the light source unit and a detection module configured to detect emission light of the sample.

17 Claims, 13 Drawing Sheets

(52) U.S. Cl.
CPC ............... *G01N 2021/6419* (2013.01); *G01N 2021/6421* (2013.01); *G01N 2021/6471* (2013.01)

(58) Field of Classification Search
CPC ...... G01N 2201/062; G01N 2021/6467; G01J 1/0492; G01J 1/08
See application file for complete search history.

(56) References Cited

U.S. PATENT DOCUMENTS

| | | | |
|---|---|---|---|
| 2005/0036142 A1 | 2/2005 | Oldham et al. | |
| 2008/0024779 A1* | 1/2008 | Aasmul | G01N 21/6428 356/300 |
| 2009/0068747 A1 | 3/2009 | Iten | |
| 2013/0004954 A1* | 1/2013 | Bianchessi | G01N 21/6428 435/6.12 |
| 2016/0282268 A1 | 9/2016 | Morimoto et al. | |
| 2018/0180865 A1* | 6/2018 | Ma | G02B 21/06 |

FOREIGN PATENT DOCUMENTS

| | | |
|---|---|---|
| JP | 2008-536092 A | 9/2008 |
| KR | 10-2013-0071645 A | 7/2013 |
| KR | 10-2018-0071777 A | 6/2018 |

OTHER PUBLICATIONS

Extended European Search Report for European Application No. 21782264.2 dated Mar. 25, 2024.
Notice of Allowance in Korean Application No. 10-2022-7037035 dated Sep. 29, 2025.

* cited by examiner

OPTICAL SIGNAL DETECTION DEVICE COMPRISING SAMPLE HOLDER DIVIDED INTO SAMPLE AREAS AND LIGHT SOURCE UNITS DEDICATED THERETO

CROSS-REFERENCE TO RELATED APPLICATIONS

This application is a national phase application of PCT Application No. PCT/KR2021/004004, filed on Mar. 31, 2021, which claims benefit to Korean Patent Application No. 10-2020-0039501, filed on Mar. 31, 2020. The entire disclosure of the applications identified in this paragraph are incorporated herein by reference.

TECHNICAL FIELD

The disclosure relates to an optical signal detection device.

BACKGROUND ART

Nucleic acid amplification reaction well known as polynucleotide chain reaction (PCR) includes repeated cycles of double-stranded DNA denaturation, annealing of the oligonucleotide primers to DNA templates, and extension/elongation of the primers with the DNA polymerase (Mullis et al., U.S. Pat. Nos. 4,683,195, 4,683,202, and 4,800,159; Saiki et al., (1985) Science 230, 1350-1354). DNA denaturation is performed at about 95° C., and annealing and primer elongation are performed at a lower temperature ranging from 55° C. to 75° C.

The fluorescent material, which is an optical marker or label, included in the samples, emits fluorescence, which is an optical signal. The light source emits excitation light to the samples, and the fluorescent material excited by the excitation light emits the fluorescence. The light source may emit white light, and a filter may be disposed in the path of the excitation light in order to emit the excitation light of a specific wavelength to the samples.

In a high throughput device that simultaneously detects the same target nucleic acid in the plurality of the samples, the excitation light is irradiated to the plurality of the samples in various ways. For example, one light source unit may be configured to irradiate light to the entire sample holder in which the plurality of the samples are accommodated. In this case, since the angle of the excitation light irradiated to the sample is different according to the position in the sample holder, the signal for the same sample is deviated according to the position of the sample.

As another example, the light source unit may irradiate incident light onto each sample while moving on the sample holder. In this case, an error due to movement of the light source and an error due to individual measurement of the plurality of the samples may occur. First of all, there is a problem that the time required for measurement increases with each cycle.

Accordingly, there is a need to develop an optical signal detection device including the light source capable of providing the excitation light more efficiently and accurately to the plurality of the samples including a plurality of different optical labels.

DISCLOSURE OF INVENTION

Technical Problem

The present inventors have made intensive researches to develop a novel optical signal detection technology in which the light source unit maintains a stable excitation light path with respect to the sample holder, and at the same time, the deviation of the optical signal according to the sample position is reduced. As a result, the present inventors found that, in the case of detect the optical signal by a scheme where a dedicated individual light source unit is allocated to each sample area with respect to the sample holder divided into a plurality of sample areas and the plurality of filter units selectively filter the light of each light source unit to generate the optical signal, while maintaining the stable excitation light path, the deviation of the optical signal according to the sample position may be reduced.

In this background, a purpose of the present invention is to provide the optical signal detection device including a plurality of filter units which selectively filter light from the light source unit wherein one dedicated individual light source unit is allocated to each of the sample areas.

Solution to Problem

According to the embodiment, the present invention provides an optical signal detection device comprising: a sample holder configured to contain a plurality of samples wherein the sample holder is divided into a plurality of sample areas; a light source module configured to irradiate light to the plurality of sample areas wherein the light source module comprises a plurality of light source units comprising a first light source unit and a second light source unit, each of the plurality of light source units is arranged to irradiate light to different sample areas, and one dedicated individual light source unit is allocated to each of the sample areas; a filter module that filter light emitted from the light source unit wherein the filter module includes a plurality of filter units comprising a first filter unit and a second filter unit, when the first filter unit is configured to be positioned in an optical path of the first light source unit, the second filter unit is configured to be positioned in the optical path of the second light source unit, the filter module is configured to be movable so that the first filter unit may selectively filter light emitted from the first light source unit or the second light source unit; and a detection module configured to detect emission light emitted from the sample area.

Advantageous Effects of Invention

The optical signal detection device according to an embodiment measures the optical signal in such a way that each light unit of the plurality of light source units irradiates excitation light onto each sample area that is a part of the sample holder. Accordingly, with the device of the present invention, the difference in the amount of light depending on the position of the sample may be reduced, compared to a device that irradiates the entire sample holder with light with a single light source unit, so that the variation of signal value according to the position between samples can be reduced.

In addition, the optical signal detection device according to an embodiment may be configured such that an individual light source unit is allocated to each sample area to irradiate light, and the light emitted from at least two light source units may be simultaneously filtered by each filter unit, and the filter unit may be able to move between the plurality of the light source units. As a result, each of the sample areas is sequentially irradiated with light in a wavelength range provided by each filter unit, so that a plurality of optical labels included in one sample may be sequentially detected. In addition, since the plurality of the filter units are allocated to filter light from the plurality of the light source units at the same time, thereby retaining the above advantages over the device that irradiates the entire sample holder with light with the single light source unit, the time required for measurement may not increase.

The light source units of the optical signal detection device according to an embodiment do not move between the sample areas, and the dedicated individual light source unit is allocated to each sample area to irradiate light. Therefore, compared to a device that measures an optical signal while the light source unit moves, it is possible to stably maintain the optical path, thereby enabling a stable measurement with high reproducibility.

When the optical signal detection device according to an embodiment includes a plurality of thermally independent reaction regions, the reaction proceeds according to an independent protocol in the thermally independent reaction regions. Therefore, the time to detect the optical signal in each reaction region is independently determined. In the optical signal detection device according to an embodiment, since the plurality of the light source units and the filter units may independently detect the optical signal for each sample area, the detection of optical signal can be efficiently performed in an device that performs an independent reaction protocol for each reaction regions.

BRIEF DESCRIPTION OF DRAWINGS

FIG. 3A shows the light source module including four light source units. FIG. 3B shows a sample holder including four sample areas. FIG. 3C explains the relative arrangement of the light source module and the sample holder;

FIG. 5A shows the light source module including four light source units. FIG. 5B shows the filter module including four filter units. FIG. 5C explains the relative arrangement of the light source module and the filter module;

MODE FOR THE INVENTION

Figure 1:
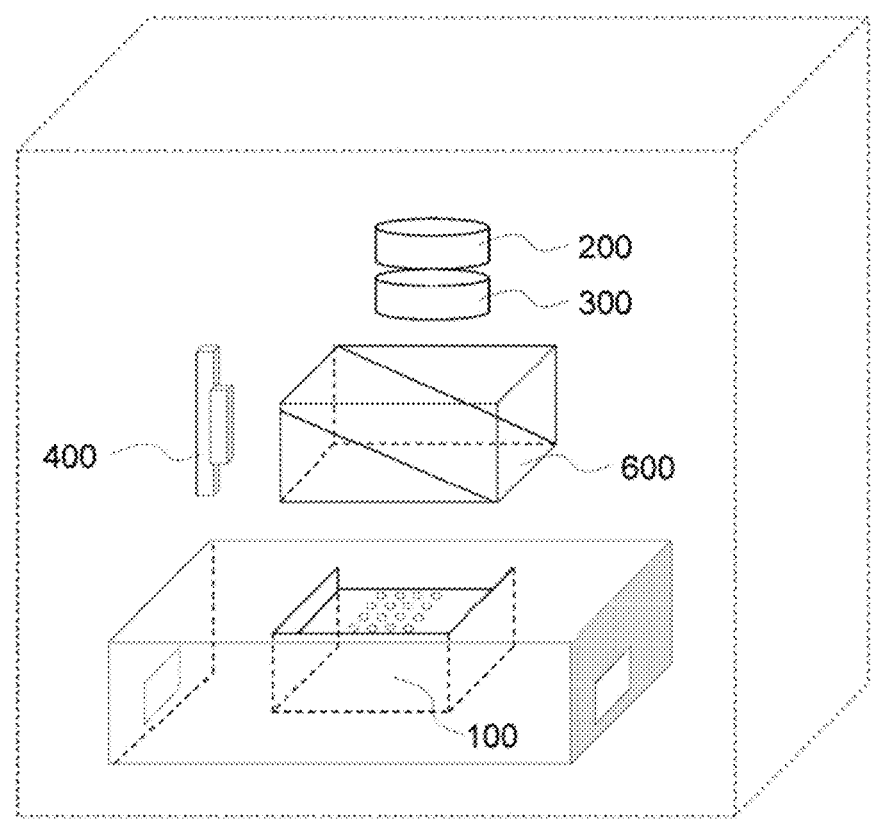
FIG. 1 is a view for describing a device for detecting an optical signal.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted in the situation in which the subject matter of the present disclosure may be rendered rather unclear thereby.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Optical Module and Signal Detection Device with Rotating Light Source and Filter FIG. 1 is a view for describing a device for detecting an optical signal.

Referring to FIG. 1, the optical signal detection device 10 includes a light source module 200, a sample holder 100, a filter module 300, and a detection module 400. The optical signal detection device 10 may further include a beam splitter 600.

The optical signal detection device 10 refers to a device that detects an optical signal generated from a sample. The optical signal may be a luminescent signal, a phosphorescent signal, a chemiluminescent signal, a fluorescent signal, a polarized fluorescent signal, or other colored signal. The optical signal generated from the sample may be, for example, a fluorescent signal. The optical signal may be an optical signal generated in response to an optical stimulus applied to the sample.

The light source module 200 and the filter module 300 supply an appropriate optical stimulus to the sample, and the detection module 400 detects an optical signal generated from the sample in response thereto. The sample holder 100 positions the sample at a predetermined position so that the optical stimulus reaches the sample and the optical signal generated from the sample reaches the detection module 400. In addition, the sample holder 100 may perform a process for detecting the optical signal from the sample, such as temperature control of the sample, if necessary.

The optical signal generated in the sample may be, for example, an optical signal that is generated depending on the properties of the target analyte, such as activity, amount, or presence (or absence), specifically presence (or absence). The size or change of the optical signal serves as an indicator qualitatively or quantitatively indicating the property of the target analyte, specifically the presence or absence of the target analyte. The target analyte may be, for example, a target nucleic acid sequence or a target nucleic acid molecule including the same. Accordingly, the optical signal detection device according to an embodiment may be a target nucleic acid sequence detection device.

The light source module 200 emits light to excite an optical label included in the sample. The light source module 200 includes a plurality of light source units 210. Light emitted by the light source unit 210 may be referred to an excitation light. The light emitted by the sample may be referred to an emission light. The path of the excitation light emitted from the light source unit 210 may be referred to an excitation path. The path of the emission light emitted from the sample may be referred to an emission path.

The light source unit 210 may include a light source element 215. One light source unit 210 may include one or more light source elements 215. In one example, the light source element 215 may be a light emitting diode (LED) including an organic LED, an inorganic LED, and a quantum dot LED, and a laser unit including a tunable laser, a He—Ne laser, and an Ar laser. According to one embodiment, the light source element 215 may be the LED.

The filter module 300 filters light emitted from the light source module 200 so that light in a specific wavelength range reaches the sample. The filter module 300 includes a plurality of filter units 310. The filter unit 310 includes one or more filters.

The beam splitter 600 reflects and transmits light incident from the light source unit 210. Light transmitted through the beam splitter 600 reaches the sample holder 100. The beam splitter 600 reflects and transmits light emitted from the sample. The beam splitter 600 may be configured such that light reflected by the beam splitter 600 reaches the detection module 400.

The sample holder 100 accommodates a sample. The sample of the present invention comprises all substances capable of being accommodated in the optical signal detection device 10 of the present invention and becoming subject to the optical signal detection reaction.

For example, the samples include biological samples (e.g., cells, tissues, and body fluids) and non-biological samples (e.g., food, water and soil), and the biological samples are, for example, viruses, bacteria, tissues, cells, blood (whole blood, plasma and serum), lymph, bone marrow, saliva, sputum, swab, aspiration, milk, urine, feces, eye fluid, semen, brain extract, cerebrospinal fluid, joint fluid, Thymus fluid, bronchial lavage fluid, ascites and amniotic fluid.

In addition, a processed product obtained by processing the biological sample or the non-biological sample are also included in the sample of the present invention.

Such the processed product includes, for example, a processed product obtained by physically or chemically processing the biological sample or a non-biological sample such as heat treatment, ultrasonic treatment, acid, and base treatment to expose an active ingredient such as nucleic acid.

In addition, the processed product comprises an extract isolated from the biological sample and the non-biological sample as well as the biological sample and the non-biological sample itself. For example, when a nucleic acid is isolated from the sample and used in a detection reaction, the isolated nucleic acid is also included in the sample of the present invention. In this case, the sample may be subjected to a nucleic acid extraction process known in the art (see Sambrook, J. et al., Molecular Cloning. A Laboratory Manual, 3rd ed. Cold Spring Harbor Press (2001)). The nucleic acid extraction process may vary depending on the type of sample.

In addition, when the extracted nucleic acid is RNA, a reverse transcription process for synthesizing cDNA may be additionally performed (Sambrook, J. et al., Molecular Cloning. A Laboratory Manual, 3rd ed. Cold Spring. Harbor Press (2001)), and a synthetic product obtained by this process, such as cDNA, is also included in the processed product.

In addition, clones or nucleic acid amplification products obtained by an amplification method in which the extracted nucleic acid or cDNA obtained therefrom is directly amplified by a method such as PCR, or by transforming the microorganism to cultivate the microorganism and then extracting the nucleic acid, is also included in the processed product.

In addition, mixtures containing the above-described biological sample, the above-described non-biological sample, or the above-described processed product thereof and an additive for optical signal detection that may be performed in the optical signal detection device 10 are also included in the scope of the sample of the present invention. The additive may include, not limited thereto, for example, a reaction solution, a buffer, a stabilizer, an enzyme, a salt, a nucleic acid fragment, dNTP, a detection probe, an optical label, a polymer bead for support or separation, and a resin, etc.

The sample holder 100 may be configured to accommodate a plurality of samples. In one example, the plurality of the samples are not necessarily limited to a set of samples derived from different sources. Specifically, the plurality of the samples are not limited to a plurality of samples that are distinguished from each other. For example, when various tests are performed in separate tubes using a blood sample collected from one patient, each solution contained in each tube is a separate sample. When nucleic acid is extracted from a blood sample collected from one patient and applied to a plurality of reaction sites that are distinguished from each other, each of the extracted solution applied to each reaction site is separate sample.

In this way, the samples applied to the reaction sites where the distinct optical signal detection reactions may proceed are separate samples that are distinguished from each other.

Accordingly, according to an embodiment, the sample holder 100 may be configured to include a plurality of reaction sites.

The sample holder 100 may be configured to directly accommodate a plurality of samples or configured to accommodate a reaction vessel containing samples. The reaction vessel of the present invention includes a reaction vessel capable of holding one sample. In addition, the reaction vessel of the present invention includes a reaction vessel capable of containing a plurality of samples separately. In addition, the reaction vessel of the present invention includes a reaction vessel in which a plurality of distinct nucleic acid probes are fixed, such as a DNA array chip.

The sample holder 100 may be a conductive material. When the sample holder 100 contacts the reaction vessels, heat may be transferred from the sample holder 100 to the reaction vessel. For example, the sample holder 100 may be made of a metal such as aluminum, gold, silver, nickel, or copper. Alternatively, a separate configuration other than the sample holder 100 may directly supply energy to the reaction vessel to control the temperature of the samples in the reaction vessel. In this case, the sample holder 100 accommodates the reaction vessels, but may be configured not to transfer heat to the reaction vessel.

An example of the sample holder 100 is a thermal block. The thermal block may include a plurality of holes or wells, and reaction vessels may be positioned in the holes or wells.

Another example of the sample holder 100 is a heating plate. The heating plate is a form in which a thin metal is brought into contact with a plate containing a sample. It may be operated by heating the plate by passing an electric current through a thin metal.

Another example of the sample holder 100 is an accommodating portion capable of accommodating one or more chips or cartridges. An example of the cartridge is a fluid cartridge comprising a flow channel.

The sample holder 100 may be configured to accommodate a plurality of samples, and a reaction for detection such as a nucleic acid amplification reaction may occur by controlling the temperature of the plurality of the samples. For example, when the sample holder 100 is a thermal block in which a plurality of wells are formed, the sample holder 100 is composed of one thermal block, and all wells of the thermal block may be not configured to be thermally independent from each other. In this case, the temperatures of all wells in which samples are accommodated in the sample holder 100 are the same, and the temperature of the accommodated samples may not be adjusted according to different protocols.

As another example, the sample holder 100 may be configured to control a temperature of some of the samples accommodated in the sample holder 100 according to different protocols. In other words, the sample holder 100 may include two or more thermally independent reaction regions. Each reaction region may be thermally independent. No heat is transferred from one reaction region to another. For example, there may be an insulating material or air gap between the reaction regions. The temperature of each of the reaction regions may be controlled independently. For each of the reaction regions, a reaction protocol including reaction temperature and time may be individually set, and each of the reaction regions may perform a reaction according to an independent reaction protocol. Since the reaction proceeds in the reaction regions according to an independent protocol, the light detection time points in the reaction regions are independent of each other.

The detection module 400 detects a signal. Specifically, the detection module 400 detects fluorescence signal, which is an optical signal generated from samples. The detection module 400 includes a detection unit 410. The detection unit 410 includes a detector that detects light.

Figure 2:
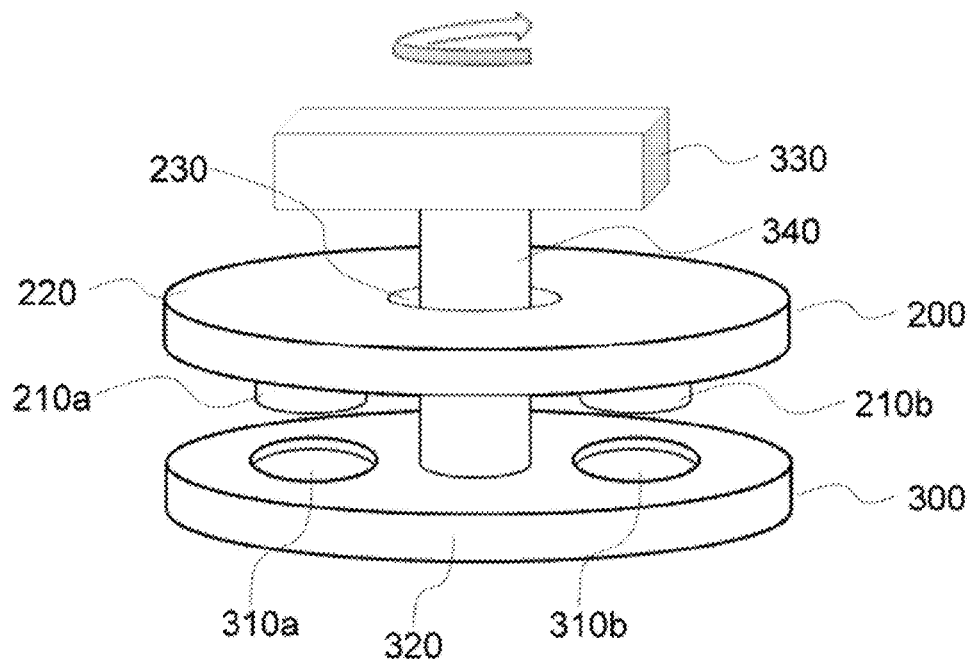
FIG. 2 is a view illustrating a light source module and a filter module according to an embodiment.

FIG. 2 is a view illustrating a light source module and a filter module according to an embodiment.

As shown in FIG. 2, the light source module 200 includes a plurality of light source units 210. Specifically, the light source module 200 includes a plurality of light source units 210 including a first light source unit 210a and a second light source unit 210b. In addition, the filter module 300 includes a first filter unit 310a and a second filter unit 310b.

The light generated from the light source module 200 is filtered by the filter module 300 to reach the sample. Accordingly, the filter units 310a and 310b are positioned under each of the light source units 210a and 210b.

According to an embodiment, the plurality of the light source units 210 may be light source units that emit light having the same wavelength properties. This means, for example, that the plurality of the light source units 210 emit light of the same wavelength range, and that the same amount of light emitted for each wavelength range. The same wavelength properties is meant to include substantially the same wavelength properties as well as exactly the same wavelength properties. The light source units that emit light having the same wavelength properties means the light source units that when the light generated from the two light source units is irradiated on the same optical label through the same filter, the same type of emitted light is generated from the optical label with the same amount of light. Specifically, the fact that the plurality of the light source units have substantially the same wavelength properties means that the amount of light or the deviation of the wavelength range of the plurality of the light source units is within 20%, 15%, or 10%.

For example, when the first light source unit 210a emits light in the visible wavelength range, the second light source unit 210b may also be configured to emit light in the visible wavelength range. In addition, for example, when the first light source unit 210a emits light in the first wavelength range and the second wavelength range, the second light source unit 210b may be also configured to emit light in the first wavelength range and the second wavelength range. In addition, the first light source unit 210a and the second light source unit 210b may be configured to have the same amount of light in the first wavelength range and the same amount of light in the second wavelength range.

Figure 3A:
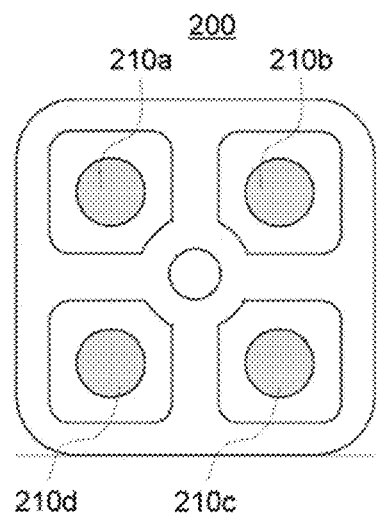
FIGS. 3A to 3C are views illustrating a light source unit and a sample area according to an embodiment.
Figure 4A:
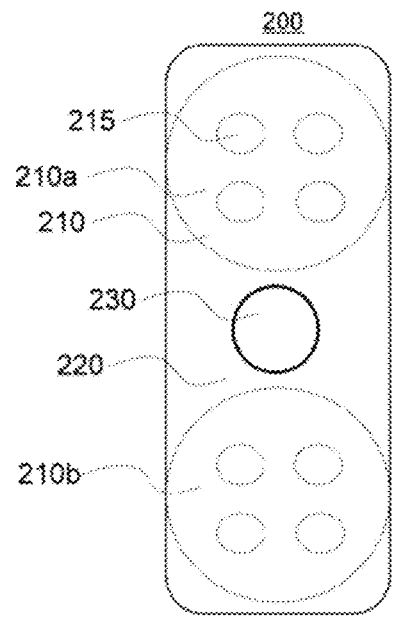
FIGS. 4A and 4B are views for explaining a light source module including two light source units and a filter module including two filter units according to an embodiment.

According to one embodiment, the light source unit may include one or more light source elements. The number of light source elements included in the light source unit of the present invention may be, for example, one. In this case, one light source element may be one light source unit. FIG. 3A shows a light source module including four light source units 210 each including one light source element. FIG. 4A shows a light source module 200 including a light source unit including a plurality of light source elements 215. FIG. 4 illustrates that each of the light source units 210a and 210b includes four light source elements 215, the number of light source elements included in the light source unit is not limited to one embodiment. Alternatively, the light source unit may include 1000, 500, 100, 50, 40, 30, 20 or less light source elements.

Figure 3B:
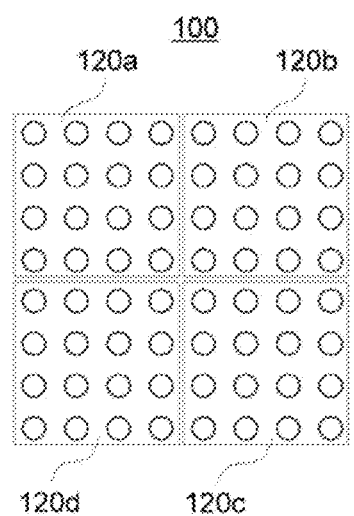
Figure 3C:
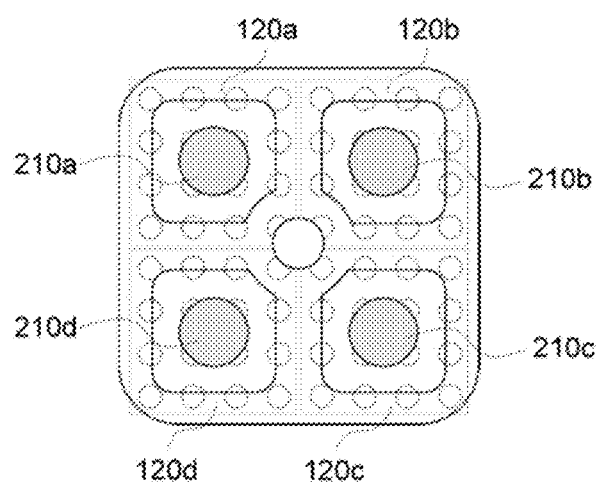

FIGS. 3A to 3C are views illustrating a light source unit and a sample area according to an embodiment. FIG. 3A shows the light source module including four light source units. FIG. 3B shows a sample holder including four sample areas. FIG. 3C shows the relative arrangement of the light source module and the sample holder.

As shown in FIG. 3B, the sample holder 100 may be divided into a plurality of sample areas 120.

In an embodiment, the sample area 120 refers to an area on the sample holder 100 where an optical signal detection reaction is performed by the same light source unit 210 for a sample located in the same sample area. In other words, the sample area of an embodiment refers to a group of reaction sites in which the optical signal detection reaction proceeds by the same light source unit among the plurality of reaction sites included in the sample holder 100. In other words, the sample area 120 is an area divided by irradiation area of the excitation light of the light source unit 210.

When the sample holder 100 includes two or more thermally independent reaction regions, each sample area 120 is not defined over two or more reaction regions but is included in one reaction region or may be defined to be the same area as one reaction region.

When the sample area 120 is defined as described above, the optical signal detection may be performed by the light source unit and the filter unit different from each other in the two or more thermally independent reaction regions in which the light detection time points are independent from each other. According to an embodiment, the sample holder may include two or more reaction regions thermally independent from each other, and each of the sample areas may be defined to be included in any one of the two or more reaction regions thermally independent from each other.

FIG. 3B shows an example in which the sample holder 100 is divided into four sample areas 120a, 120b, 120c, and 120d, but the sample holder and the sample area are not limited thereto. The sample holder may be, for example, a sample holder including 2, 3, 4, 5, 6, 8, 10, 12, 16, 20, 24 sample areas.

According to one embodiment, the number of reaction sites included in each of the sample areas 120 may be the same. In other words, the sample areas 120 may have the same number of samples that may be accommodated in each sample area. For example, as shown in FIG. 3B, each sample area 120 may include 16 reaction sites. The number of reaction sites that may be included in each sample area 120, that is, the number of samples that may be accommodated in each sample area is not particularly limited, and may be, for example, 2, 3, 4, 5, 6, 7, 8, 9 or more, and 1000, 900, 800, 700, 600, 500, 400, 384, 300, 200, 100, 96, 48, 32, 24, 16 or less.

Each light source unit of the plurality of the light source units is arranged to irradiate light to different sample areas.

The light source module may be configured that the plurality of the light source units included in the light source module are disposed to irradiate light to different sample areas. In the optical signal detection device 10 of an embodiment, not all reaction sites of the sample holder receive light by the same light source unit, but the plurality of the light source units irradiate light respectively onto the plurality of group of reaction sites. As a result, the deviation of the amount of light according to the position of the sample positioned in the sample holder is reduced, thereby reducing the deviation of the signal according to the position between the samples.

FIG. 3A is a view illustrating a light source module 200 according to one embodiment. The light source module 200 may include four light source units 210*a* to 210*d*. FIG. 3B is a view illustrating a sample holder 100 according to one embodiment. The sample holder 100 may include four sample areas 120*a* to 120*d*.

FIG. 3C shows the arrangement of the light source module 200 with respect to the sample holder 100 in order to describe the sample areas 120*a* to 120*d* to which light is irradiated by each light source unit 210*a* to 210*d* of the light source module 200.

Referring to FIG. 3C, the first light source unit 210*a* is disposed to irradiate light to the first sample area 120*a*, and the second light source unit 210*b* is disposed to irradiate light to the second sample area 120*b*. In addition, the third light source unit 210*c* and the fourth light source unit 210*d* are also disposed to irradiate light to the third sample area 120*c* and the fourth sample area 120*d*, respectively.

In addition, one dedicated individual light source unit is allocated to each of the sample areas. As shown in FIG. 3C, the first light source unit 210*a* is disposed to irradiate light to the first sample area 120*a*, and is configured not to irradiate light to other sample areas. In addition, the first sample area 120*a* is configured such that light emitted from the first light source unit 210*a* is irradiated, and light emitted from other light source units is not irradiated.

When one light source unit moves to irradiate light to two or more sample areas, it is difficult to maintain the same light path for one sample area at all times, and thus an error may occur. In addition, even when the light source unit is fixed without moving, if two or more light source units are configured to irradiate light to one sample area, excitation light passing through different filters is simultaneously irradiated to the same sample area so that crosstalk may occur. In addition, in order to avoid the risk of crosstalk, each light source unit must sequentially irradiate light to the sample unit and sequentially detect optical signals. Therefore, an increase in time required for optical signal detection is inevitable.

In the case where a dedicated individual light source unit is allocated to each sample area to irradiate light, as in the optical signal detection device 10, since the light source module does not need to move in relation to the sample holder, it is easy to maintain an elaborate light path. In addition, since each light source unit does not irradiate light to an area other than the allocated sample area, the plurality of the light source units are able to simultaneously irradiate light, thereby enabling rapid optical signal detection.

The number of the light source units included in the light source module may be, for example, 2, 3, 4, 5, 6, 8, 10, 12, 16, 20, or 24.

According to an embodiment, in the optical signal detection device 10, the number of the light source units and the number of the sample areas may be the same. The optical signal detection device 10 may include a plurality of light source modules. In this case, the total number of the light source units included in the plurality of the light source modules and the number of the sample areas may be the same. As long as each light source unit irradiates light to different sample areas, and one dedicated individual light source unit is allocated to each sample area, the the optical signal detection device 10 may include a plurality of light source modules.

The optical signal detection device 10 includes a filter module 300. The filter module 300 filters light emitted from the light source unit 210. The filtration may mean selectively passing light in a specific wavelength range among the light emitted from the light source unit or selectively blocking light in a specific wavelength range. The "selectively passing light" may mean passing 50%, 60%, 70%, 80%, or 90% or more of the amount of light in the desired wavelength range. The "selectively blocking light" may mean blocking without passing 50%, 60%, 70%, 80%, or 90% or more of the amount of light in the target wavelength range.

The filter module 300 selectively passes light of a specific wavelength range among the light emitted from the light source unit to irradiate the sample. As a result, only a specific optical label among the optical labels included in the sample generates an optical signal.

The optical label may be an optical label selected from the group consisting of Cy2™, YO-PRO™-1, YOYO™-1, Calcein, FITC, FluorX™, Alexa™, Rhodamine 110, Oregon Green™ 500, Oregon Green™ 488, RiboGreen™, Rhodamine Green™, Rhodamine 123, Magnesium Green™, Calcium Green™, TO-PRO™-1, TOTO1, JOE, BODIPY530/550, DiI, BODIPY TMR, BODIPY558/568, BODIPY564/570, Cy3™ Alexa™ 546, TRITC, Magnesium Orange™, Phycoerythrin R&B, Rhodamine Phalloidin, Calcium Orange™, Pyronin Y, Rhodamine B, TAMRA, Rhodamine Red™, Cy3.5™, ROX, Calcium Crimson™, Alexa™ 594, Texas Red, Nile Red, YO-PRO™-3, YOYO™-3, R-phycocyanin, C-Phycocyanin, TO-PRO™-3, TOTO3, DiD DiIC (5), Cy5™, Thiadicarbocyanine, Cy5.5, HEX, TET, Biosearch Blue, CAL Fluor Gold 540, CAL Fluor Orange 560, CAL Fluor Red 590, CAL Fluor Red 610, CAL Fluor Red 635, FAM, Fluorescein, Fluorescein-C3, Pulsar 650, Quasar 570, Quasar 670 and Quasar 705. In particular, the label may be an optical label selected from the group consisting of FAM, CAL Fluor Red 610, HEX, Quasar 670, and Quasar 705.

Figure 4B:
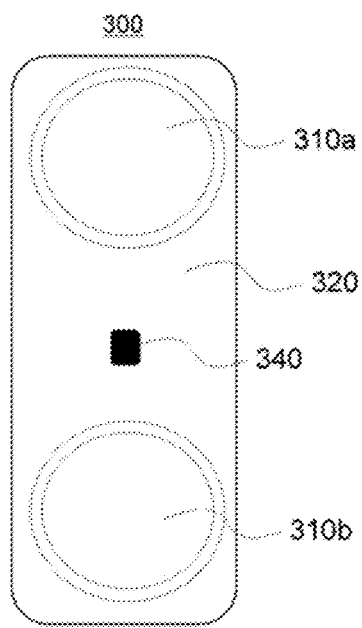

The filter module 300 includes a plurality of filter units 310. Referring to FIG. 4B, the filter module 300 may include a first filter unit 310*a* and a second filter unit 310*b*. Referring to FIG. 5B, the filter module 300 may include four filter units 310*a* to 310*d*.

Each of the filter units includes a filter. Each of the filter units includes a filter that passes light in a wavelength range capable of excitation of at least one of the optical labels. The filter included in the filter unit may be a bandpass filter. The bandpass filter refers to a filter that selectively transmits light in a predetermined wavelength range. The wavelength range of light passing through the bandpass filter is referred to as a passband of the filter. The passband may be displayed in the form of a wavelength range. A filter including a specific passband means a filter that passes light having a wavelength included in the specific passband. For example, the first filter unit 310*a* may be a filter of a first passband, and the second filter unit 310*b* may be a filter of a second passband. Each of the first passband and the second passband may include a wavelength range of light capable of exciting a specific optical label.

The specific type of the optical label is as described above. In particular, the optical label may be an optical label selected from the group consisting of FAM, CAL, Fluor Red 610, HEX, Quasar 670, and Quasar 705.

The first filter unit 310*a* and the second filter unit 310*b* may pass light capable of exciting different optical labels. Accordingly, according to an embodiment, the passbands of the first filter unit 310*a* and the second filter unit 310*b* may not overlap each other. The filter units included in the filter module 300 may be disposed to selectively excite different optical labels. Accordingly, according to an embodiment, the passbands of the filter units included in the filter module may be different from each other.

Referring back to FIG. 2, the filter module 300 is configured to be movable so that each of the filter units 310*a* and 310*b* may selectively filter light emitted from the light source units 210*a* and 210*b*. To this end, the optical signal detection device 10 may include a filter support 320. The plurality of filter units 310 may be disposed on the filter support 320. The filter units 310 may be fixed to the filter support 320. In one embodiment, the filter support 320 is configured to be movable. The filter units 310 fixed to the filter support 320 are moved by the movement of the filter support 320. Although the filter support 320 is shown in a circular shape in FIG. 2, the shape of the filter support 320 is not limited thereto, and may have various shapes such as a circle, an ellipse, and a square.

According to one embodiment, the optical signal detection device 10 may include a moving means capable of moving the plurality of the filter units 310. The filter support 320 may be configured to be movable by the moving means 330. The moving means 330 may be, for example, a motor. The motor may be, for example, an AC motor, a DC motor, a step motor, a servo motor, or a linear motor, and preferably a step motor.

The moving means 330 may move the filter support 320 through a connection shaft 340, for example. The movement may be, for example, a rotation movement that rotates about the connection shaft 340. For example, the connection shaft 340 for transmitting the power of the motor 330 to the filter support 320 may be configured to connect the motor 330 and the filter support 320. Both ends of the connection shaft 340 may be directly connected to the filter support 320 and the motor 330 to transmit power. Alternatively, one end of the connection shaft 340 may be connected to the filter support 320, and the other end may be indirectly connected to the motor 330 through other power transmission means such as gears, belts, and pulleys. The position of the moving means 330 is not particularly limited. For example, as shown in FIG. 2, when the light source module 200 is positioned between the moving means 330 and the filter support 320, the light source module 200 may be formed with a through hole 230 through which the connection shaft 340 may pass.

The filter module includes a plurality of filter units including a first filter unit and a second filter unit. When the first filter unit is positioned in an optical path of the first light source unit, the second filter unit is configured to be positioned in the optical path of the second light source unit. The optical path of the first light source unit refers to the path through which the light passes from the first light source unit to the sample area.

In other words, when the first filter unit is in a position capable of filtering light irradiated from the first light source unit to the sample area, the second filter unit is configured to be in a position capable of filtering light irradiated from the second light source unit to the sample area.

In addition, according to an embodiment, the plurality of the filter units may be disposed such that the plurality of the light source units irradiate light to each sample area through different filter units.

Figure 5A:
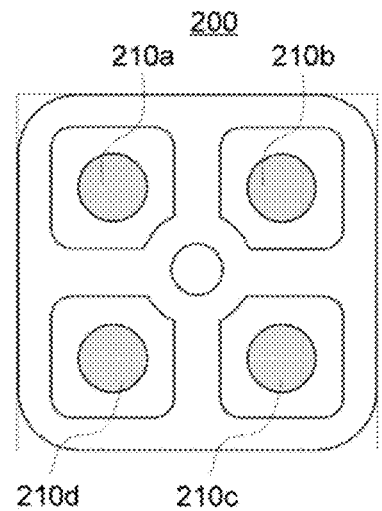
FIGS. 5A to 5C are views for explaining a light source module including four light source units and a filter module including four filter units corresponding thereto according to an embodiment.
Figure 5B:
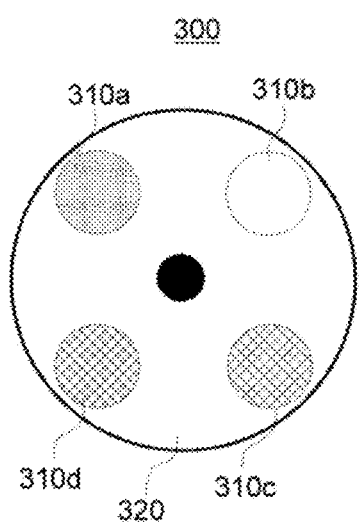
Figure 5C:
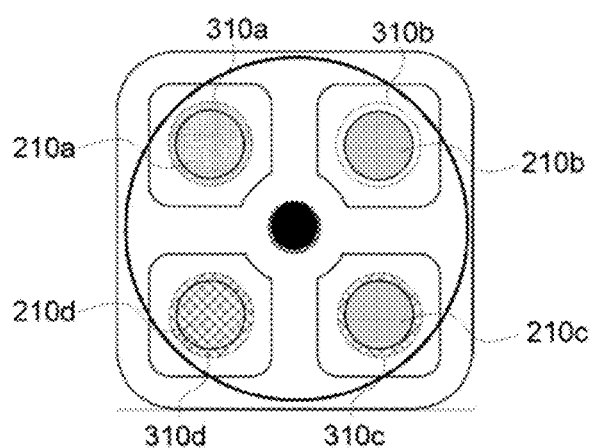

FIGS. 5A to 5C are views for explaining a light source module including four light source units and a filter module including four filter units corresponding thereto according to an embodiment. FIG. 5A shows a light source module including four light source units 210*a* to 210*d* including a first light source unit 210*a* and a second light source unit 210*b*. FIG. 5B shows a filter module including four filter units 310*a* to 310*d* including a first filter unit 310*a* and a second filter unit 310*b*. FIG. 5C is a view in which the light source module 200 and the filter module 300 are stacked in order to explain the relative arrangement of the light source module 200 and the filter module 300. As shown in FIG. 5C, when the first filter unit 310*a* is positioned to selectively filter the light emitted from the first light source unit 210*a*, the second filter unit 310*b* may be positioned in a place that may selectively filter the light emitted from the second light source unit 210*b*.

As described above, according to one embodiment, the plurality of the filter units are are arranged in the filter support such that at least two or more filter units 310*a* to 310*d* are simultaneously positioned in different optical paths of the light source units 210*a* to 210*d*. With this arrangement, the optical signal detection device 10 may simultaneously irradiate light filtered to a specific wavelength range to two or more sample areas.

In addition, the filter module 300 includes a plurality of filter units including a first filter unit 310*a* and a second filter unit 310*b*. The first filter unit 310*a* may be configured to be movable to selectively filter light emitted from the first light source unit 210*a* and the second light source unit 210*b*. In other words, the filter units 310 may be configured to move between the light source units 210. The movement method is not particularly limited, and may be, for example, rotational movement.

The filter module 300 according to an embodiment as shown in FIG. 5 may be configured to be rotatable. Accordingly, the first filter unit 310*a* positioned on the first light source unit 210*a* may move to a position where the second light source unit 210*b* is positioned. Accordingly, the filter module 300 may be configured to be movable so that the first filter unit 310*a* may selectively filter the light emitted from the first light source unit 210*a* or the second light source unit 210*b*. By the movement, all light source units 210*a*, 210*b*, 210*c*, 210*d* included in the light source modules 200 may selectively emit, to the sample, light in the wavelength range determined by the filter units 310a, 310b, 310c, 310d.

The positions of the filter units 310 may be synchronously changed by the movement of the filter support 320. According to an embodiment, the filter unit 310 located in each light source unit 210 may be synchronously replaced by the movement of the filter support 320 in the optical signal detection device 10.

Figure 6:
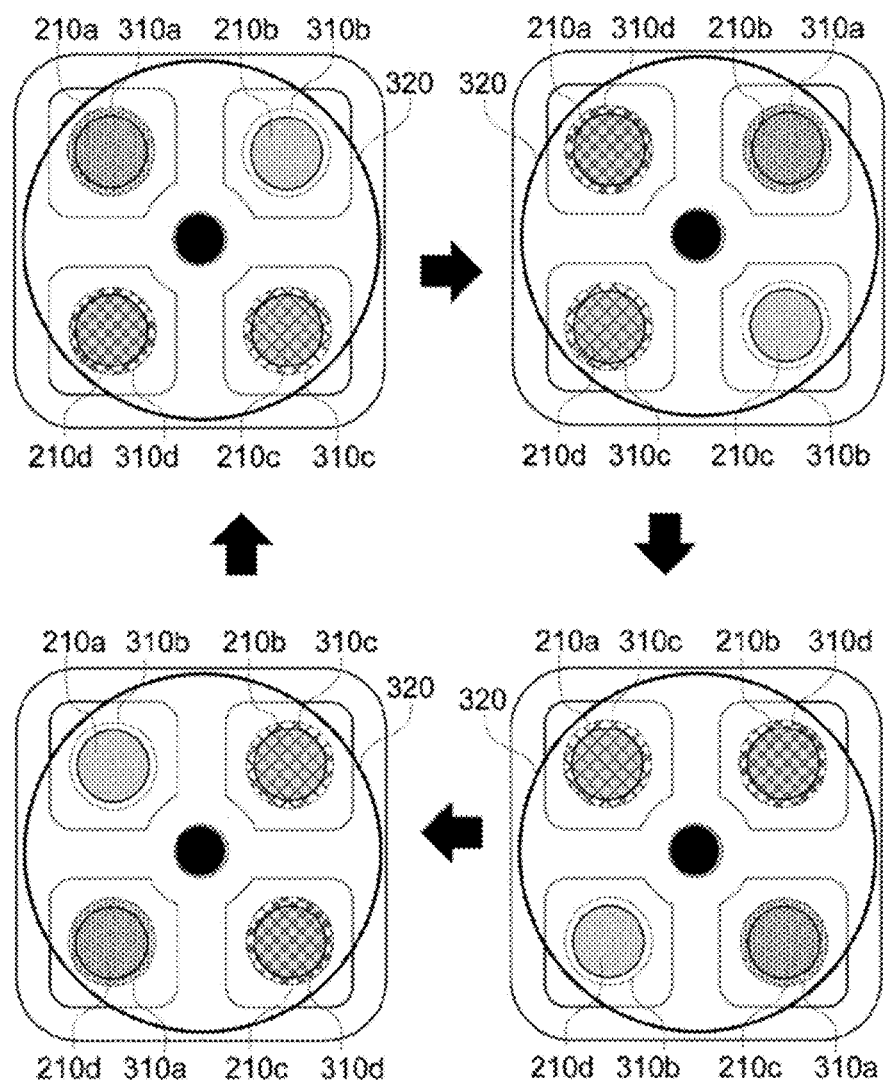
FIG. 6 is a view illustrating that a plurality of filter units according to an embodiment move to sequentially filter light emitted from a plurality of light source units.

As shown in FIG. 6, for example, when the filter support 320 includes four filter units 310a, 310b, 310c, 310d, at least two filter units may be positioned in the light paths of different light source units. Specifically, a first filter unit 310a is disposed in the first light source unit 210a, a second filter unit 310b is disposed in the second light source unit 210b, a third filter unit 310c is disposed in the third light source unit 210c, and a fourth filter unit 310d is disposed in the fourth light source unit 210d.

When the filter support 320 rotates and the filter units move, the fourth filter unit 310d is disposed in the first light source unit 210a, the first filter unit 310a is disposed in the second light source unit 210b, the second filter unit 310b is disposed in the third light source unit 210c, and the third filter unit 310c is disposed in the fourth light source unit 210d.

When the filter support 320 rotates again and the filter units move, the third filter unit 310c is disposed in the first light source unit 210a, and the fourth filter unit 310d is disposed in the second light source unit 210b, the first filter unit 310a is disposed in the third light source unit 210c, and the second filter unit 310b is disposed in the fourth light source unit 210d.

In this way, the filter unit 310 allocated to each light source unit 210 may be synchronously replaced by the movement of the filter support 320.

In order to synchronously replace the filter units 310 as described above, the filter support 320 includes n filter units 310, and, the filter support 320 is rotated 360/n degrees at a time by the moving means 330, according to an embodiment. The n may be a natural number of 2 or more. In one embodiment, the filter support 320 may include two filter units 310, and the filter support 320 may be rotated 180 degrees at a time. In another example, the filter support 320 includes three filter units 310, and the filter support 320 may be rotated 120 degrees at a time. The filter support 320 may include four filter units 310, and the filter support 320 may be rotated 90 degrees at a time. FIG. 6 shows that the filter support 320 including the four filter units 310 rotates 90 degrees at a time, so that the filter units 310 allocated to each light source unit 210 are synchronously replaced.

By this synchronous movement, excitation light corresponding to the wavelength range of each filter unit 310 may be sequentially irradiated to every sample area.

Figure 7A:
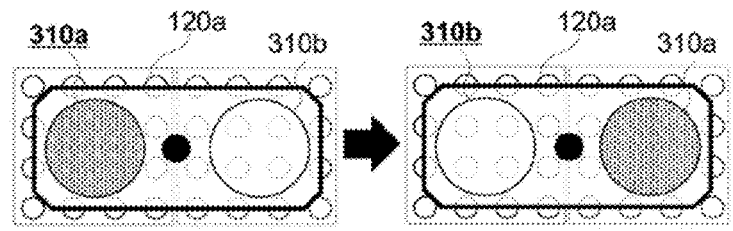
FIGS. 7A and 7B is a view illustrating that a plurality of filter units according to an embodiment move to filter excitation light irradiated to the same sample area of a sample holder according to an embodiment.
Figure 7B:
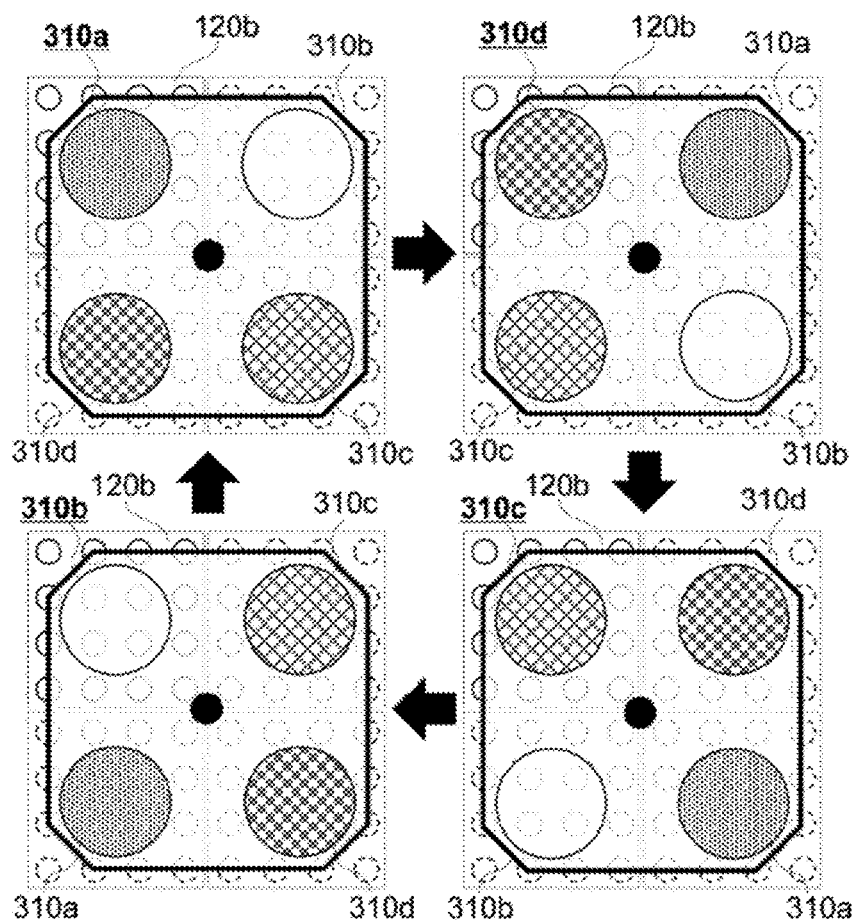

FIGS. 7A and 7B are views illustrating a positional relationship between the filter module 300 having the plurality of the filter units 310 and the plurality of the sample areas. As one of various structures for allowing the excitation light generated by the light source unit (not shown) to pass through the filter unit 310 to reach the sample area, each filter unit 310 may be configured to face the sample area directly. In other words, each filter unit 310 may be positioned above each sample area 120 of the sample holder.

FIG. 7A shows a filter module having two filter units to filter excitation light irradiated to two sample areas. According to the structure of FIG. 7A, by rotation of the filter module, two excitation lights having different wavelength regions may be sequentially irradiated to each sample area.

FIG. 7B shows a filter module having four filter units to filter excitation light irradiated to four sample areas. Excitation light in four wavelength ranges may be irradiated to each of the sample regions 120b by four filter units.

In the structure of FIG. 7A, two types of optical signals may be detected in all sample areas by measuring two times. In the structure of FIG. 7B, four types of optical signals may be detected in all sample areas by measuring four times. Even in a conventional device that measures an optical signal using excitation light in a single wavelength range for the entire sample holder, four measurements are required to detect four types of optical signals. As described above, the optical signal detection device 10 may maintain the processing speed equivalent to that of the conventional device while reducing the deviation of the signal according to the position of the sample by dividing the sample holder and arranging the light source.

FIG. 8 is a view illustrating a device including a filter module and a light source module according to an embodiment.

Figure 8A:
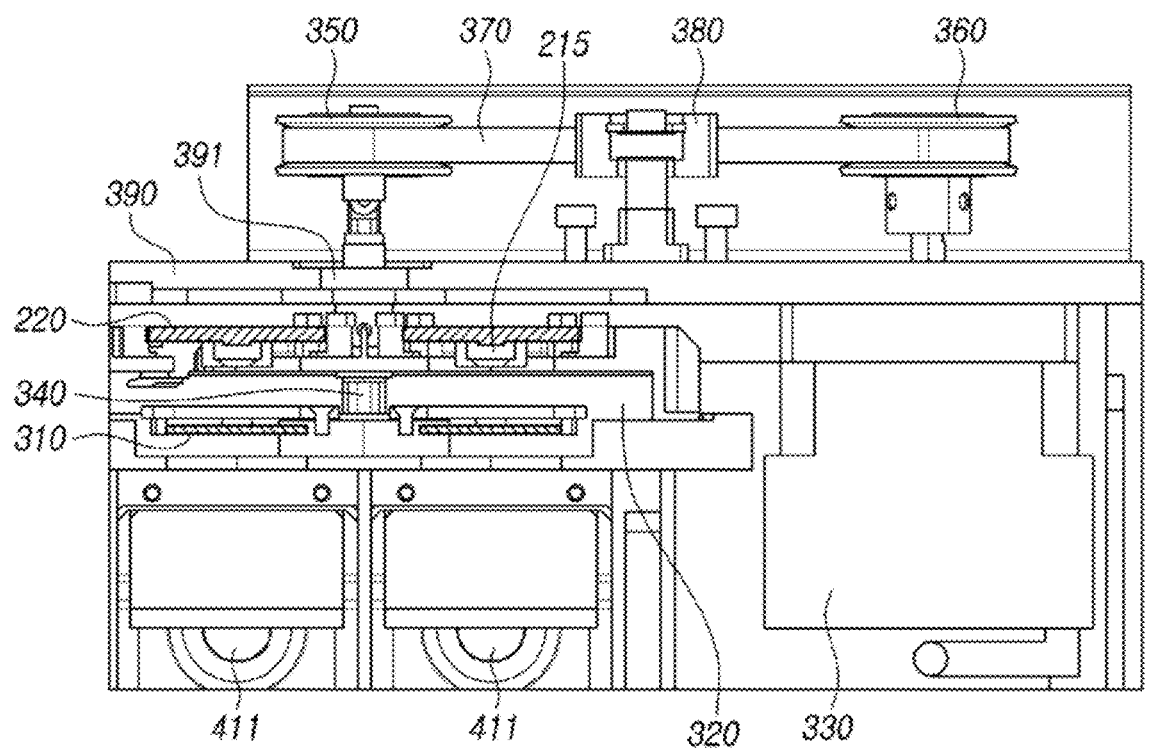
FIG. 8 is a view illustrating a device including a filter module and a light source module according to an embodiment.

FIG. 8A shows an optical signal detection device according to an embodiment. The optical signal detection device includes a light source module including a plurality of light source units for irradiating light to a sample holder, and a filter module spaced apart from the light source module.

The apparatus of the present invention includes a support plate 390 to which a light source module and a moving module are fixed.

The light source module includes a light source support 220 and a plurality of light source units 210 fixed to the light source support 220. The plurality of the light source units 210 are allocated to irradiate light to a plurality of sample areas of the sample holder. The light source module is configured by being fixed to the lower surface of the support plate 390.

Figure 8B:
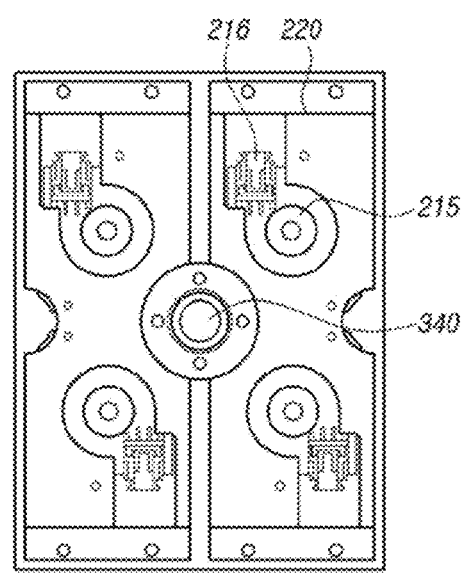

FIG. 8B shows a light source module according to an embodiment. The light source module includes four light source units. The light source unit includes a light source element 215 and a power supply unit 216. A through hole 230 is formed in the center of the light source module so that the connection shaft 340 connecting the filter support and the moving means may pass therethrough. FIG. 8B is a cross-sectional view in which the connection shaft 340 connecting the first pulley and the filter support 320 to the through hole 230 and a fixing member fixing the connection shaft to the filter support 320 are disposed.

Figure 8C:
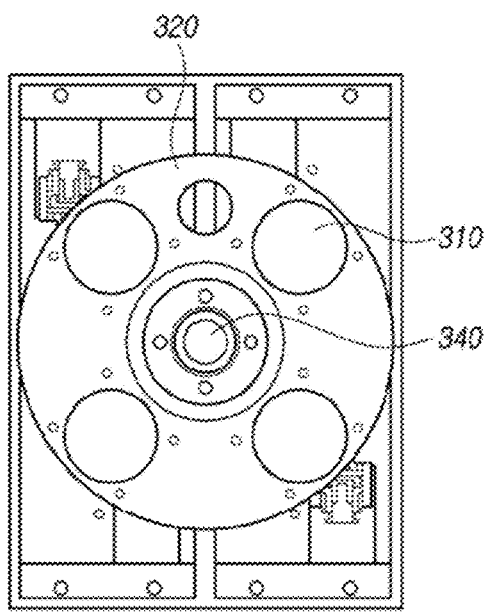

Referring to FIGS. 8A and 8C, the filter module 300 includes the filter support 320 and a plurality of filter units 310. The plurality of the filter units 310 are filter units corresponding to the plurality of light source units, and the filter unit 310 is configured to filter excitation light irradiated from the light source unit 210. The filter support 320 is configured to be rotatable about the connection shaft 340. Specifically, one end of the connection shaft 340 is connected to the center of the filter support 320, and the connection shaft 340 passes through the through hole 230 of the light source module 200 and is fixed to the first pulley 350. The first pulley 350 is positioned on the upper surface of the support plate 390.

Accordingly, a second through hole 391 may be formed in the support plate 390 to fix the connection shaft 340 to the first pulley 350. A second through hole 391 may be configured to have a bushing structure or a bearing structure supporting the outer surface of the connection shaft 340 so as to rotate with respect to the support plate 390 together with a connection shaft 340 corresponding to the second through hole 391. Such a structure enables the support plate 390 to support the first pulley 350 to enable stable rotation.

The first pulley may be configured to rotate in connection with the second pulley 360 connected to the motor 330 through the pulley belt 370. The second pulley 360 is configured such that the rotation axis of the second pulley and that of the first pulley 350 are parallel, and the central axis of the second pulley 360 is connected to a motor, which is a moving means 330.

The first pulley 350 and the second pulley 360 may be timing pulleys on which threads are formed. The pulley belt may be a timing belt in which threads corresponding to the threads of the first pulley 350 and the second pulley 360 are formed.

According to one embodiment, the optical signal detection device 10 may further include a tension pulley 380. The tension pulley 380 serves to maintain a constant tension of the pulley belt 370 by supporting the pulley belt 370 shouldered between the first pulley 350 and the second pulley 360 in a pressed state.

In the optical signal detection device 10, the pulley-timing belt-pulley method is an example of a method of transmitting power required for rotation of a filter module, and power transmission may also be carried out in a direct coupling method of a motor and filter module, a gear-gear method, a gear-chain-gear method, and a pulley-belt-pulley method.

Figure 9:
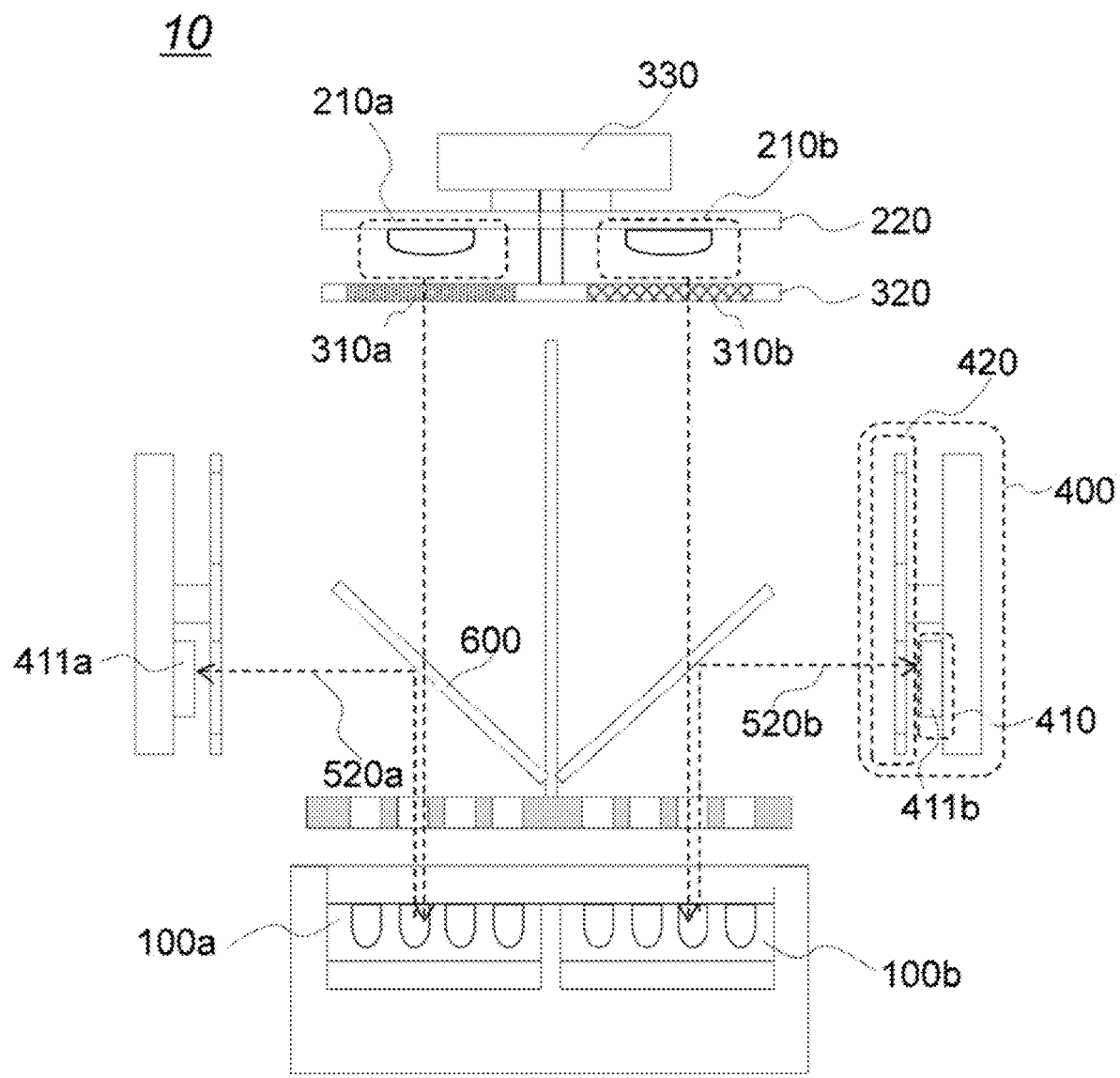
FIG. 9 is a schematic diagram of an device including a light source module, a filter module, a detection module, and a sample holder according to an embodiment.

FIG. 9 is a schematic diagram of a device including a light source module, a filter module, a detection module, and a sample holder according to an embodiment.

Referring to FIG. 9, the detection module 400 detects an optical signal emitted from a sample accommodated in a sample holder. The optical label is excited by the excitation light irradiated from the light source module 200 through the filter module 300 to the sample, and the optical signal is emitted from the optical label. The optical signal may be received by the detection module 400. In this process, the optical path of the excitation light may be refracted by, for example, the beam splitter 600 so that the the excitation light may reach the detection module 400. When the detection module 400 is in a linear path of the optical path, the optical signal may be received without the use of the beam splitter 600.

The sample holder 100 may include two or more reaction regions 100a and 100b that are thermally independent from each other, and each reaction region may be defined as a different sample area. Specifically, the first reaction region 100a defined as the first sample area proceeds an optical signal detection reaction by the first light source unit 210a, and the second reaction region 100b defined as the second sample area proceeds the optical signal detection reaction by the second light source unit 210b. Therefore, even if each of the reaction regions proceeds a reaction according to an independent protocol, since each of the light source units is independently positioned, optical signals may be detected at an optimum reaction time respectively.

FIG. 9 is shown to include one filter module, but the optical signal detection device is not limited thereto. According to an embodiment, the the optical signal detection device may include a sample holder including a reaction sites arranged in 8×12, and the reaction sites arranged in 4×4 as one sample area in the sample holder. A total of 6 sample areas are defined separately, and the optical signal detection device may include a light source module including 6 light source units arranged in each sample area. In addition, in order to arrange the filter units in the optical paths of the six light source units, the optical signal detection device may include two filter modules including four filter units.

According to one embodiment, the filter module may further include a first additional filter unit. The first additional filter unit may be disposed so that when the first filter unit and the second filter unit are respectively positioned in the optical path of the first light source unit and the optical path of the second light source unit, the first additional filter unit is not positioned in the optical path of other light source units.

The filter module may include a plurality of filter units including a first filter unit and a second filter unit. When the first filter unit is positioned in the optical path of the first light source unit, the second filter unit is configured to be positioned in the optical path of the second light source unit. Filter units satisfying the above rules may be classified into one group, which is referred to as a first group. In other words, the first group is a group of filter units arranged such that when one filter unit among the plurality of the filter units belonging to the first group is positioned in the light path of one light source unit, at least one other filter unit belonging to the first group is positioned in the optical path of at least one different light source unit.

All of the filter units included in the filter module of an embodiment may be arranged to satisfy the above rule. In this case, the optical signal detection efficiency for the entire sample area may increase. However, when it is necessary to irradiate the sample area with light of a larger number of wavelength range, the filter module must include an additional filter unit in addition to the filter units that are disposed in accordance with the above rules and are synchronously replaced.

When one of the filter units of the first group is positioned in the optical path of the light source unit, such an additional filter unit may not be arranged to be positioned in the optical path of another light source unit at the same time. Therefore, the additional filter unit may be disposed in accordance with rules different from the filter units of the first group. According to an embodiment, the filter module 300 includes a plurality of filter units classified into a first group, and may further include one or more filter units not classified into the first group.

Figure 10:
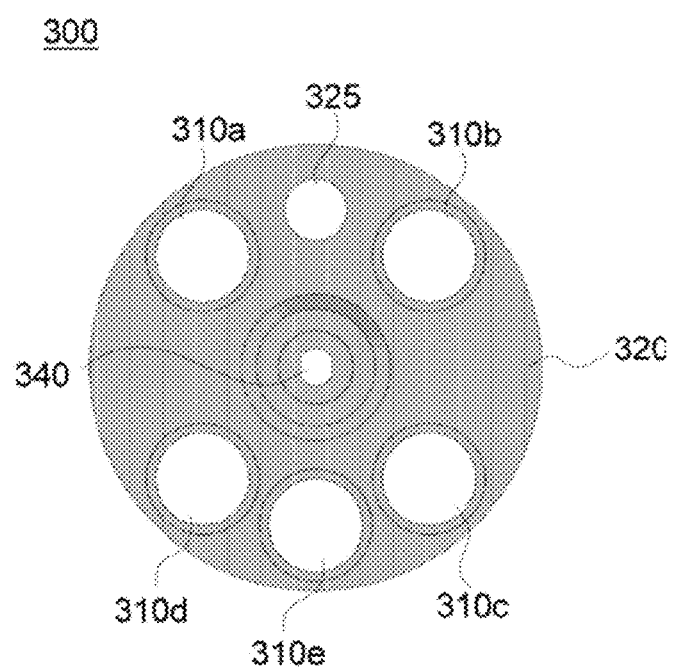
FIG. 10 is a view illustrating a filter module including a plurality of filter units, a filter support, and a reference hole according to an embodiment.

FIG. 5 shows an embodiment of a filter module comprising a first group of filter units. FIG. 10 shows a filter module 300 including a filter unit of the first group and a first additional filter unit not classified into the first group, unlike FIG. 5. The filter module shown in FIG. 10 includes four filter units 310a to 310d classified into a first group. As shown in FIG. 5, the four filter units of the first group are disposed on the filter support 320 so that two or more filter units are simultaneously positioned in different optical paths of the light source units 210a to 210d. In addition, the filter module 300 shown in FIG. 10 includes a first additional filter unit 310e. When the first additional filter unit 310e is positioned in the optical path of one light source unit 210, the first group of filter units 310a to 310d may not be positioned in any optical path of the unit 210.

According to an embodiment, the filter module may include a plurality of additional filter units not classified into the first group, and a plurality of additional filter units not classified into the first group may be arranged to be classified into a second group. The second group is a group of filter units arranged such that when one filter unit among the plurality of the additional filter units belonging to the second group is positioned in the light path of one light source unit, at least one other additional filter unit belonging to the second group is positioned in the optical path of at least one different light source unit.

The first additional filter unit is also arranged to be positioned in the optical paths of the light source units in which the filter units divided into the first group are positioned by the movement of the filter module 300, so that light of a desired wavelength range may be irradiated to the sample area.

Accordingly, according to one embodiment, a plurality of filter units including the first filter unit and the second filter unit may be disposed in rotational symmetry with respect to one axis of symmetry, and the first additional filter unit may be disposed such that a distance between the plurality of filter units including the filter unit and the second filter unit and the axis of symmetry may be the same as the distance between the first additional filter unit and the axis of symmetry. The distance may be, for example, a distance between the center point of each filter unit and the axis of symmetry.

Referring to FIG. 10, the first additional filter unit 310e may be disposed such that a distance between the first additional filter unit 310e and the connection shaft 340 corresponding to the axis of symmetry may be the same as a distance between the first group of filter units 310a-310d and the connection shaft 340. According to such arrangement of the plurality of filter units, the plurality of the filter units are rotated around a symmetry axis, so that both the first group of filter units and the first additional filter units may be sequentially disposed in the light paths of the light source units.

According to an embodiment, the filter module 300 may include a reference hole 325. The reference hole 325 may be formed in the filter support 320 of the filter module 300.

According to one embodiment, the reference hole 325 may be arranged to be positioned in the optical path of at least one light source unit of the plurality of light source units 210 by the movement of the filter support 320.

When the reference hole 325 is positioned in the optical path of one light source unit 210 by the movement of the filter support 320, the light of the light source unit 210 passing through the reference hole 325 is detected. Therefore, the reference position of the filter support 320 may be configured, and the filter support 320 may position the filter units 310 at an accurate position.

According to one embodiment, the reference hole 325 may be configured to pass light in all wavelength ranges. The reference hole 325 may be, for example, an empty space, or may include a transparent film through which light of all wavelengths may pass.

According to an embodiment, the reference hole 325 may include a filter that passes light in a specific wavelength range. In this case, the filter may be a filter that passes light having a wavelength range different from that of the filter units 310 of the filter module 300.

The size of the reference hole 325 is not particularly limited, but may be the same as or smaller than the size of the filter unit.

The detection module 400 detects an optical signal by generating an electric signal according to the intensity of the optical signal.

Like the light source module 200, the detection module 400 may be disposed at a fixed position to maintain an accurate optical path with respect to the sample holder 100.

According to an embodiment, the detection module 400 may include a detection unit 410 and a detection filter unit 420. In one embodiment, the detection unit 410 may be a plurality of detection units 410, each detection unit including a detector, and may be arranged to detect the emission light of each sample area.

The detection filter unit 420 may be disposed in front of the detection unit 410. The detection filter unit 420 may include a detection filter, and a detection filter disposed in front of the detection unit 410 may be changed according to a wavelength of emitted light. The detection filter of the detection module is a filter for selectively passing emission light emitted from the optical label included in the sample. When the detector detects light in a wavelength range other than the emitted light emitted from the optical label included in the sample, the optical signal may not be accurately detected. The detection filter makes it possible to accurately detect a target by selectively passing emission light emitted from an optical label.

The detection unit 410 may include a detector 411. The detector 411 is arranged to detect the emission light emitted from the optical label included in the sample. The detector may detect the amount of light for each wavelength by dividing the wavelength of light, or may detect the total amount of light regardless of the wavelength. Specifically, the detector 411 may be, for example, a photodiode, a photodiode array, a photo multiplier tube (PMT), a CCD image sensor, a CMOS image sensor, an avalanche photodiode (APD), or the like.

The detector 411 is arranged to detect the emitted light emitted from the optical label included in the sample.

According to one embodiment, the detector 411 may be disposed to be located in the emission light paths 520a and 520b generated from the sample holder. Specifically, the detector 411 may be disposed toward the sample holder 100 so that the emission light generated from the sample may directly reach the detector 411, or the detector 411 may be disposed toward the reflector or the optical fiber such that the emission light may reach the detector 411 through the reflector or the optical fiber. As an example, as in the case of FIG. 9, the detector 411 may be disposed toward the beam splitter 600 from which the emission light is reflected.

According to an embodiment, the detector may be a plurality of detectors. In this case, the plurality of detectors 411a and 411b may be configured to detect emission light generated in a predetermined area of the sample holder, respectively. Referring to FIG. 9, the first detector 411a is configured to detect the emission light 520a emitted from the first sample area 100a of the sample holder, and the second detector 411b is configured to detect the emission light 520b emitted from the second sample of the sample holder. According to one embodiment, the optical signal detection device may detect a plurality of signals in the first sample area 100a of the sample holder, and the plurality of signals may be also detected in the second sample area 100b of the sample holder.

FIG. 9 shows that a plurality of detection modules 400 each include a detector 411, but the optical signal detection device according to an embodiment is not limited thereto, and as shown in FIG. 8A, a plurality of detectors 411 may be disposed in the detection module and detect the emission light emitted from each different sample area.

In addition, the terms such as "include", "consist of" or "have" described above mean that the corresponding component may be included unless otherwise stated, excluding other components such that they should be interpreted as being able to further include other components. All terms, including technical or scientific terms, have the same meaning as commonly understood by one of ordinary skill in the art, unless otherwise defined. Generally used terms, such as terms defined in the dictionary, should be interpreted as being consistent with the meaning in the context of the related technology, and are not interpreted as ideal or excessively formal meanings unless explicitly defined in the present invention.

The examples described herein may be expanded to individual elements and concepts described herein, independently from other concepts, ideas, or systems and may be combined with elements cited anywhere in the present invention. Although some examples have been described in detail with reference to the accompanying drawings, the concept is not limited to such examples. Thus, the scope of the concept is intended to be defined by the appended claims and their equivalents. Further, specific features described individually or as some examples may be combined with other features described individually or other examples although not specifically mentioned for the specific features. Thus, the absence of a description of such combination should not be interpreted as excluding such combination from the scope of the present invention.

While embodiments of the disclosure have been described above, it will be easily appreciated by one of ordinary skill in the art that the scope of the disclosure is not limited thereto. Thus, the scope of the disclosure is defined by the appended claims and equivalents thereof.

CROSS-REFERENCE TO RELATED APPLICATIONS

This application claims priority from Korean Patent Application No. 10-2020-0039501, filed on Mar. 31, 2020, in the Korean Intellectual Property Office, the disclosure of which is incorporated herein by reference in its entirety.

The invention claimed is:

1. An optical signal detection device, comprising:
a sample holder configured to contain a plurality of samples, wherein the sample holder is divided into a plurality of sample areas, each of the sample areas comprising a group of reaction sites;
a light source module configured to irradiate light to the plurality of sample areas, wherein the light source module comprises a plurality of light source units comprising a first light source unit and a second light source unit, wherein each of the plurality of light source units is arranged to irradiate light to different sample areas, and wherein one dedicated individual light source unit is allocated to each of the sample areas, and wherein each of the plurality of light source units comprises at least one light source element;
a movable filter module that filters light emitted from the light source units, wherein the filter module includes a plurality of filter units comprising a first filter unit and a second filter unit, wherein when the first filter unit is configured to be positioned in an optical path of the first light source unit, the second filter unit is configured to be positioned in the optical path of the second light source unit; moving means configured to move the filter module so that the first filter unit may selectively filter light emitted from the first light source unit or the second light source unit; and
a detection module configured to detect emission light emitted from the sample area,
wherein the plurality of filter units are arranged so that the plurality of light source units irradiate light to each sample area through different filter units.

2. The optical signal detection device of claim 1, wherein the sample holder comprises two or more reaction regions thermally independent from each other, and each sample area is defined to be comprised in any one of the two or more reaction regions thermally independent from each other.

3. The optical signal detection device of claim 1, wherein the filter module comprises a first additional filter unit, and the first additional filter unit is arranged such that when the first filter unit and the second filter unit are respectively positioned in the optical path of the first light source unit and the optical path of the second light source unit, the first additional filter unit is not positioned in any optical path of the light source.

4. The optical signal detection device of claim 1, wherein the plurality of filter units comprising the first filter unit and the second filter unit are arranged rotationally symmetrically about one axis of symmetry and
the first additional filter unit is arranged such that a distance between the plurality of filter units comprising the first filter unit and the second filter unit and the axis of symmetry and the distance between the first additional filter unit and the axis of symmetry are the same.

5. The optical signal detection device of claim 1, wherein the light source module further comprises a light source support, and wherein the first light source unit and the second light source unit are fixed to the light source support, and wherein the light source support is positioned between the moving means and the filter support.

6. The optical signal detection device of claim 1, wherein the filter module comprises a first group of filter units including the plurality of filter units and a second group of filter units including a plurality of additional filter units, wherein the second group of filter units is arranged such that when one filter unit among the plurality of the additional filter units belonging to the second group is positioned in the optical path of one light source unit, at least one other additional filter unit belonging to the second group is positioned in the optical path of at least one different light source unit, wherein the first group of filter units and the second group of filter units are arranged such that at least two filter units belonging to the same group of filter units are positioned in the optical path of at least two light source units at the same time.

7. The optical signal detection device of claim 1, wherein the plurality of light source units emit light having the same wavelength characteristics.

8. An optical signal detection device, comprising:
a sample holder configured to contain a plurality of samples, wherein the sample holder is divided into a plurality of sample areas, each of the sample areas comprising a group of reaction sites;
a light source module configured to irradiate light to the plurality of sample areas, wherein the light source module comprises a plurality of light source units comprising a first light source unit and a second light source unit, wherein each of the plurality of light source units is arranged to irradiate light to different sample areas, and wherein one dedicated individual light source unit is allocated to each of the sample areas, and wherein each of the plurality of light source units comprises at least one light source element;
a movable filter module that filters light emitted from the light source units, wherein the filter module includes a plurality of filter units comprising a first filter unit and a second filter unit, wherein when the first filter unit is configured to be positioned in an optical path of the first light source unit, the second filter unit is configured to be positioned in the optical path of the second light source unit; moving means configured to move the filter module so that the first filter unit may selectively filter light emitted from the first light source unit or the second light source unit;

a detection module configured to detect emission light emitted from the sample area; and a filter support on which the plurality of filter units are arranged, wherein the filter units allocated to each light source unit are synchronously replaced by the movement of the filter support.

9. The optical signal detection device of claim 8, wherein the plurality of filter units are arranged in the filter support such that at least two or more filter units are simultaneously positioned in different light paths of the light source units.

10. The optical signal detection device of claim 8, wherein the filter support comprises n filter units, and the filter support is rotated 360/n degrees at a time by the movement means, and n is a natural number of 2 or more.

11. The optical signal detection device of claim 8, wherein the filter support comprises a reference hole.

12. The optical signal detection device of claim 11, wherein the reference hole is arranged to be positioned in an optical path of at least one of the plurality of light source units by movement of the filter support.

13. The optical signal detection device of claim 8, wherein the sample holder comprises two or more reaction regions thermally independent from each other, and each sample area is defined to be comprised in any one of the two or more reaction regions thermally independent from each other.

14. The optical signal detection device of claim 8, wherein the filter module comprises a first additional filter unit, and the first additional filter unit is arranged such that when the first filter unit and the second filter unit are respectively positioned in the optical path of the first light source unit and the optical path of the second light source unit, the first additional filter unit is not positioned in any optical path of the light source.

15. The optical signal detection device of claim 8, wherein the plurality of filter units comprising the first filter unit and the second filter unit are arranged rotationally symmetrically about one axis of symmetry and the first additional filter unit is arranged such that a distance between the plurality of filter units comprising the first filter unit and the second filter unit and the axis of symmetry and the distance between the first additional filter unit and the axis of symmetry are the same.

16. The optical signal detection device of claim 8, wherein the filter module comprises a first group of filter units including the plurality of filter units and a second group of filter units including a plurality of additional filter units, wherein the second group of filter units is arranged such that when one filter unit among the plurality of the additional filter units belonging to the second group is positioned in the optical path of one light source unit, at least one other additional filter unit belonging to the second group is positioned in the optical path of at least one different light source unit, wherein the first group of filter units and the second group of filter units are arranged such that at least two filter units belonging to the same group of filter units are positioned in the optical path of at least two light source units at the same time.

17. The optical signal detection device of claim 8, wherein the plurality of light source units emit light having the same wavelength characteristics.

* * * * *